United States Patent
Huang et al.

(10) Patent No.: US 10,911,743 B2
(45) Date of Patent: Feb. 2, 2021

(54) FIELD OF VIEW EXPANSION BY COLOR SEPARATION

(71) Applicant: Facebook Technologies, LLC, Menlo Park, CA (US)

(72) Inventors: Ningfeng Huang, Redmond, WA (US); Hee Yoon Lee, Bellevue, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 112 days.

(21) Appl. No.: 16/165,964

(22) Filed: Oct. 19, 2018

(65) Prior Publication Data
US 2020/0128229 A1    Apr. 23, 2020

(51) Int. Cl.
| | | |
|---|---|---|
| *H04W 36/12* | (2009.01) | |
| *H04N 13/344* | (2018.01) | |
| *H04N 13/324* | (2018.01) | |
| *H04N 13/339* | (2018.01) | |
| *F21V 8/00* | (2006.01) | |
| *G02B 27/01* | (2006.01) | |

(52) U.S. Cl.
CPC ......... *H04N 13/344* (2018.05); *G02B 6/0076* (2013.01); *G02B 27/0172* (2013.01); *H04N 13/324* (2018.05); *H04N 13/339* (2018.05); *G02B 2027/0134* (2013.01); *G02B 2027/0178* (2013.01)

(58) Field of Classification Search
CPC .... G02B 30/22; G02B 30/23; G02B 27/0172; G02B 27/017; G09G 3/2003; H04N 13/122; H04N 13/344; H04N 13/324
See application file for complete search history.

(56) References Cited

U.S. PATENT DOCUMENTS

| | | | |
|---|---|---|---|
| 5,856,842 A | 1/1999 | Tedesco | 348/14.16 |
| 5,880,883 A * | 3/1999 | Sudo | G02B 30/35 |
| | | | 359/462 |
| 6,757,105 B2 | 6/2004 | Niv et al. | 359/569 |
| 6,882,479 B2 | 4/2005 | Song et al. | 359/630 |
| 7,710,655 B2 | 5/2010 | Freeman et al. | 359/636 |
| 8,548,290 B2 | 10/2013 | Travers et al. | 385/37 |
| 8,837,050 B2 | 9/2014 | Hudman | 359/619 |
| 9,933,684 B2 | 4/2018 | Brown et al. | |

(Continued)

OTHER PUBLICATIONS

NPL Google Search; 2020; (Year: 2020).*

(Continued)

*Primary Examiner* — Luis Perez-Fuentes
(74) *Attorney, Agent, or Firm* — Matthew A. Pequignot; Pequignot + Myers

(57) ABSTRACT

A display system is presented for displaying a color stereoscopic image comprising first and second images for user's left and right eyes respectively. A first display is configured for displaying first and second color channels of the first image to the left eye, such that a field of view of the first color channel of the first image is offset from a field of view of the second color channel of the first image in a first direction. A second display is configured for displaying first and second color channels of the second image to the right eye, such that a field of view of the first color channel of the second image is offset from a field of view of the second color channel of the second image in a second direction opposite to the first direction.

20 Claims, 6 Drawing Sheets

(56) References Cited

U.S. PATENT DOCUMENTS

| | | | | |
|---|---|---|---|---|
| 10,107,950 B2* | 10/2018 | Tseng | ............... | G02B 6/0028 |
| 2012/0236133 A1* | 9/2012 | Gallagher | ............... | G06T 5/50 |
| | | | | 348/60 |
| 2016/0116739 A1 | 4/2016 | TeKolste et al. | | |
| 2017/0289529 A1* | 10/2017 | Carollo | ............... | H04N 13/398 |
| 2017/0299860 A1 | 10/2017 | Wall et al. | | |
| 2018/0268751 A1* | 9/2018 | Lin | ............... | G02B 30/00 |
| 2020/0128229 A1* | 4/2020 | Huang | ............... | H04N 13/344 |

OTHER PUBLICATIONS

Anaglyph 3D; Wikipedia; 2015; (Year: 2015).*
Create 3D anaglyph images with 3 lines of Rubi code; 2015; (Year: 2015).*

* cited by examiner

FIELD OF VIEW EXPANSION BY COLOR SEPARATION

TECHNICAL FIELD

The present disclosure relates to visual displays and display systems, and in particular to wearable displays, systems, and methods therefor.

BACKGROUND

Head-mounted displays (HMDs), near-eye displays (NEDs), and other kinds of wearable display systems can be used to provide virtual scenery to a user, or to augment a real scenery with additional information or virtual objects. In stereoscopic wearable display systems, the virtual or augmented scenery is frequently made to appear three-dimensional (3D). This is commonly achieved by presenting parallax-shifted images to the left and right eyes of a user. In some display systems, a head and/or eye position and orientation of the user are tracked in real time, and the displayed scenery is dynamically adjusted depending on the user's head orientation and gaze direction, to provide experience of immersion into a simulated or augmented 3D environment.

It is desirable to expand field of view of a wearable display, for a greater degree of immersion into virtual reality. However, wider field of view may come at a cost of increased weight and complexity of the display's optics block, which may be detrimental or even prohibitive in some types of displays. Compact planar optical components, such as waveguides, gratings, Fresnel lenses, etc., may be used to reduce size and weight of an optics block. Compact planar optics may have limitations related to image resolution, image quality, ability to see the real world through the display, field of view of generated imagery, etc.

BRIEF DESCRIPTION OF THE DRAWINGS

Exemplary embodiments will now be described in conjunction with the drawings, in which.

DETAILED DESCRIPTION

Figure 1A:
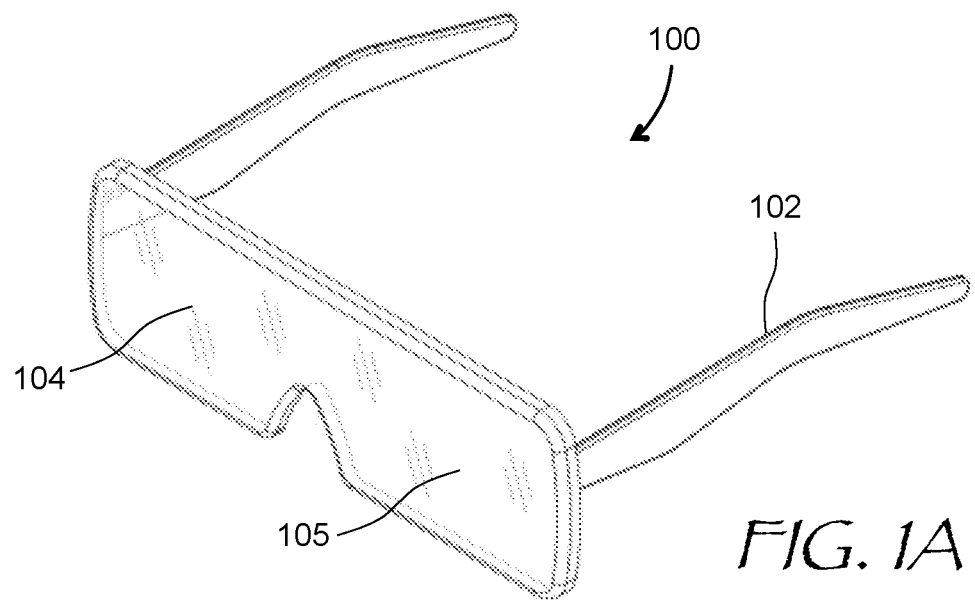
FIG. 1A is an isometric view of a wearable display of the present disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

It is desirable to increase a field of view (FOV) of a wearable display to provide a greater degree of immersion of a user into the virtual or simulated environment. However, in a wearable display system, an FOV is often limited by the technology used to deliver images to eyes of the user.

In accordance with the present disclosure, a visual perception phenomenon known as binocular summation, that is, improved visual performance of binocular vision as compared to that of monocular vision of each eye, can be advantageously used to increase an overall perceived FOV of a wearable display. In display systems where the FOV is color-dependent, the overall FOV may be increased by shifting FOV of certain color channels. As a result of the FOV shift, a limited color range may be available at edges of the extended FOV for left and right eyes of the user. However, this may be acceptable because a limited color range at FOV edges for one eye can be compensated, to some extent, by a complementary color range available to the other eye. The color range of the other eye's display may also be limited; however, for as long as the lack of color channels at the FOV edges for the left and right eyes is complementary, the overall color perception may be preserved for the expanded FOV. For example, a red color channel may be absent at a left edge of the FOV of the left eye display, but present at the left edge of the FOV of the right eye display, and vice versa: the red color channel may be absent at the right edge of the FOV of the right eye display but present at the right edge of the FOV of the left eye display. The same may apply for blue color channel, or for another color channel. Due to the effect of binocular summation, a human brain may compensate for the lack of a color channel at an edge of the FOV of one eye by providing the missing information at the edge of the FOV from the other eye. As a result, the overall FOV of binocular color vision of a wearable display system can be effectively expanded.

In accordance with the present disclosure, there is provided a display system for displaying a color stereoscopic image comprising first and second images for user's left and right eyes respectively. The display system includes a first display configured for displaying first and second color channels of the first image to the left eye, such that a field of view (FOV) of the first color channel of the first image is offset from an FOV of the second color channel of the first image in a first direction; and a second display configured for displaying first and second color channels of the second image to the right eye, such that an FOV of the first color channel of the second image is offset from an FOV of the second color channel of the second image in a second direction opposite to the first direction.

In some embodiments, the FOV of the first color channel of the first image may overlap the FOV of the second color channel of the second image, and/or the FOV of the second color channel of the first image may overlap the FOV of the first color channel of the second image. In embodiments where the first and second images each include a third color channel, the first and second displays may be configured for displaying the third color channel with an FOV including the FOVs of the first and second color channels of each one of the first and second images. By way of a non-limiting example, the first color channel may be a blue channel, the second color channel may be a red channel, and the third color channel may be a green channel.

In some embodiments, the first display may include a first pupil-replicating waveguide having an FOV for the first color channel offset from an FOV of the second color channel in the first direction. The second display may include a second pupil-replicating waveguide having an FOV for the first color channel offset from an FOV of the second color channel in the second direction.

In accordance with the present disclosure, there is provided a wearable display for displaying a color stereoscopic image comprising first and second images for user's left and right eyes respectively. The wearable display includes a first pupil-replicating waveguide assembly for displaying first and second color channels of the first image to the left eye, and a second pupil-replicating waveguide assembly for displaying first and second color channels of the first image to the right eye. The first pupil-replicating waveguide assembly may have an FOV for a first color channel offset from an FOV of the second color channel in the first direction. The second pupil-replicating waveguide assembly may have an FOV for a first color channel offset from an FOV of the second color channel in a second direction opposite to the first direction.

In some embodiments, the FOV of the first pupil-replicating waveguide assembly for the first color channel may overlap the FOV of the second pupil-replicating waveguide assembly for the second color channel, and/or the FOV of the first pupil-replicating waveguide assembly for the second color channel may overlap the FOV of the second pupil-replicating waveguide assembly for the first color channel. The first and second directions may correspond to horizontal directions when the wearable display is worn by a user for displaying the color stereoscopic image. In embodiments where the first and second images each comprise a third color channel, an FOV of the first pupil-replicating waveguide assembly for the third color channel may include the FOVs of the first pupil-replicating waveguide assembly for each one of the first and second color channels, and an FOV of the second pupil-replicating waveguide assembly for the third color channel may include the FOVs of the second pupil-replicating waveguide assembly for each one of the first and second color channels.

The first and second pupil-replicating waveguide assemblies may each include a plurality of waveguides. By way of a non-limiting example, the first and second pupil-replicating waveguide assemblies may each include a first waveguide for conveying light of at least the first color channel and a second waveguide for conveying light of at least the second color channel. The first and second waveguides of each one of the first and second pupil-replicating waveguide assemblies may each be configured for propagating light at the third color channel. By way of a non-limiting example, the first color channel may be a blue channel, the second color channel may be a red channel, and the third color channel may be a green channel.

In accordance with the present disclosure, there is further provided a method for displaying a color stereoscopic image comprising first and second images for user's left and right eyes respectively. The method may include: displaying first and second color channels of the first image to the left eye, such that an FOV of the first color channel of the first image is offset from an FOV of the second color channel of the first image in a first direction; and displaying first and second color channels of the second image to the right eye, such that an FOV of the first color channel of the second image is offset from an FOV of the second color channel of the second image in a second direction opposite to the first direction. The FOV of the first color channel of the first image may overlap the FOV of the second color channel of the second image, and/or the FOV of the second color channel of the first image may overlap the FOV of the first color channel of the second image.

In some embodiments, the method further includes: displaying a third color channel of the first image to the left eye, such that an FOV of the third color channel includes the FOVs of the first and second color channels of the first image; and displaying a third color channel of the second image to the right eye, such that an FOV of the third color channel includes the FOVs of the first and second color channels of the second image. For example, the first color channel may be a blue channel, the second color channel may be a red channel, and the third color channel may be a green channel. The first and second directions may both be horizontal directions, for example.

Figure 1B:
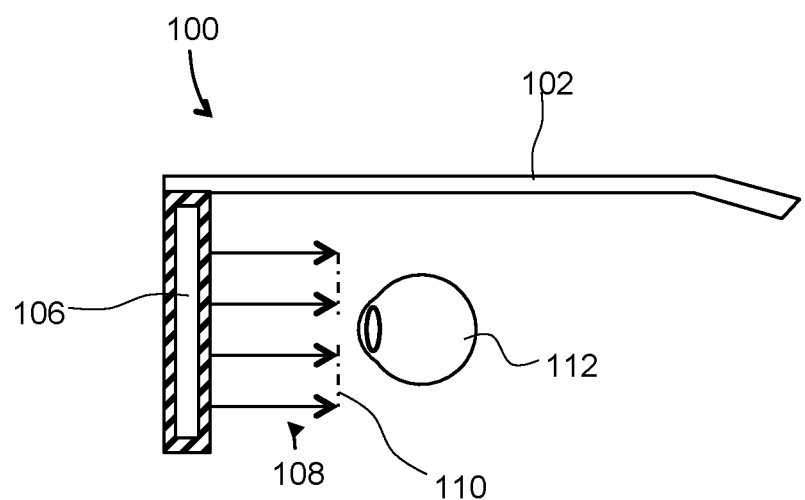
FIG. 1B is a side cross-sectional view of the wearable display of FIG. 1A.

Referring now to FIGS. 1A and 1B, a near-eye artificial reality (AR)/virtual reality (VR) display 100 is an example of a display system with an expanded field of view (FOV). A body or frame 102 of the near-eye AR/VR display 100 may have a form factor of a pair of eyeglasses, as shown. A color stereoscopic image to be displayed includes two images to be presented to user's left and right eyes by first 104 and second 105 display units, respectively. Each one of two display units 104, 105 may include a display assembly 106 (FIG. 1B), which provides image light 108 to an eyebox 110, i.e. a geometrical area where a good-quality image may be presented to a user's eye 112.

Figure 2:
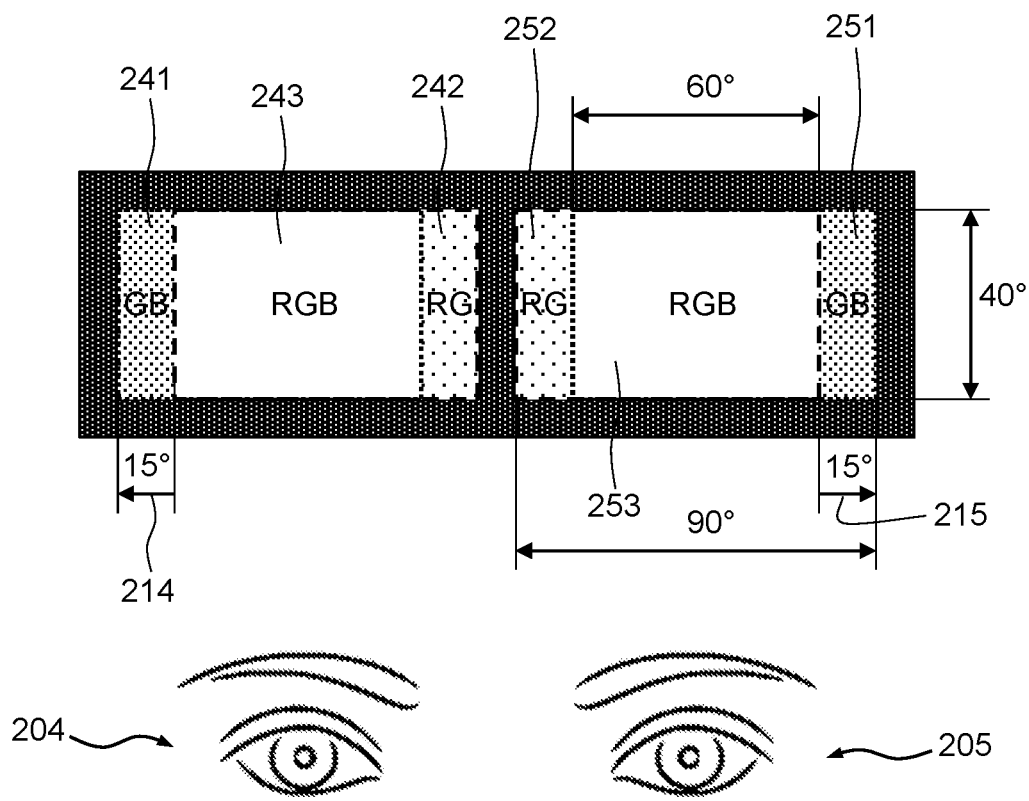
FIG. 2 is a field of view (FOV) diagram of the wearable display of FIGS. 1A and 1B for left and right eyes of a user.

Turning to FIG. 2 with further reference to FIG. 1A, the first display unit 104 (FIG. 1A) may be configured for displaying a first color channel of the first image, e.g. blue (B) color channel, and a second color channel of the first image, e.g. red (R) color channel, to user's left eye 204 (FIG. 2). A FOV 241 of the B color channel of the first image is shown with dotted lines. A FOV 242 of the R color channel of the first image is shown with dashed lines. The FOV 241 of the B color channel of the first image is offset from the FOV 242 of the R color channel of the first image in a first direction 214. The magnitude of the offset is 15 degrees in this example.

A second display unit 105 (FIG. 1A) is configured for displaying a first color channel of the second image, i.e. the B color channel, and a second color channel of the second image, i.e. the R color channel in this example, to user's right eye 205 (FIG. 2). A FOV 251 of the B color channel of the second image is shown with dotted lines. A FOV 252 of the R color channel of the second image is shown with dashed lines. The FOV 251 of the B color channel of the second image is offset from the FOV 252 of the R color channel of the second image in a second direction 215 opposite to the first direction 214. The magnitude of the offset is also 15 degrees in this example, such that the FOV 241 of the B color channel of the first image coincides with or overlaps the FOV 252 of the R color channel of the second image; and the FOV 242 of the R color channel of the first image coincides with, or overlaps, the FOV 251 of the B color channel of the second image.

The first and second images may include a third color channel, which is green (G) color channel in this example.

The first 104 display unit can be configured for displaying the G color channel with a FOV 243 including the fields of view of the B and R color channels, 241 and 242, of the first image, that is, the image for the left eye 204. Similarly, the second 105 display unit can be configured for displaying the G color channel with a FOV 253 including the fields of view of the B and R color channels, 251 and 252, of the second image, that is, the image for the right eye 205.

In such a configuration, the left eye 204 will see full RGB picture in the middle 60 degrees of the horizontal FOV; GB picture, lacking R color channel, in the left 15 degrees of the horizontal FOV; and RG picture, lacking B color channel, in the right 15 degrees of the horizontal FOV. The right eye 205 will see full RGB picture in the middle 60 degrees of the horizontal FOV; RG picture, lacking B color channel, in the left 15 degrees of the horizontal FOV; and GB picture, lacking R color channel, in the right 15 degrees of the horizontal FOV. The vertical FOV is 40 degrees in this example.

Referring now particularly to the left 15 degrees of the binocular FOV, the left eye 204 will miss the R color channel, and the right eye 205 will miss the B color channel. Due to the binocular summation effect, the user may perceive, at least after some initial adaptation, that the left 15 degrees of the binocular FOV include all color channels, i.e. RGB. Similarly, referring now to the right 15 degrees of the binocular FOV, the left eye 204 will miss the B color channel, and the right eye 205 will miss the R color channel. Due to the binocular summation, the user may perceive, at least after some initial adaptation, that the right 15 degrees of the binocular FOV include all color channels, i.e. RGB. Therefore, by using display units 104, 105, which are only capable of 75 degrees of horizontal FOV for R and B color channels, albeit the full 90 degrees for G color channel, one can construct a display with RGB capability in the horizontal FOV of 90 degrees. The visual effect may be not as pronounced as full RGB, but that may be not as noticeable due to the areas of binocular RGB summation being disposed at edges of FOV.

In some embodiments, the display 100 may include a single AR/VR display assembly for both eyes. An optical switching device, not shown, may be coupled to a single electronic display for directing images to the left and right eyes of the user in a time-sequential manner, one frame for left eye and one frame for right eye. The images are presented fast enough, i.e. with a fast enough frame rate, that the individual eyes do not notice the flicker and perceive smooth, steady images of surrounding virtual or augmented scenery. Thus, "display units" or displays 104 and 105 may be portions of a same display assembly.

Figure 3:
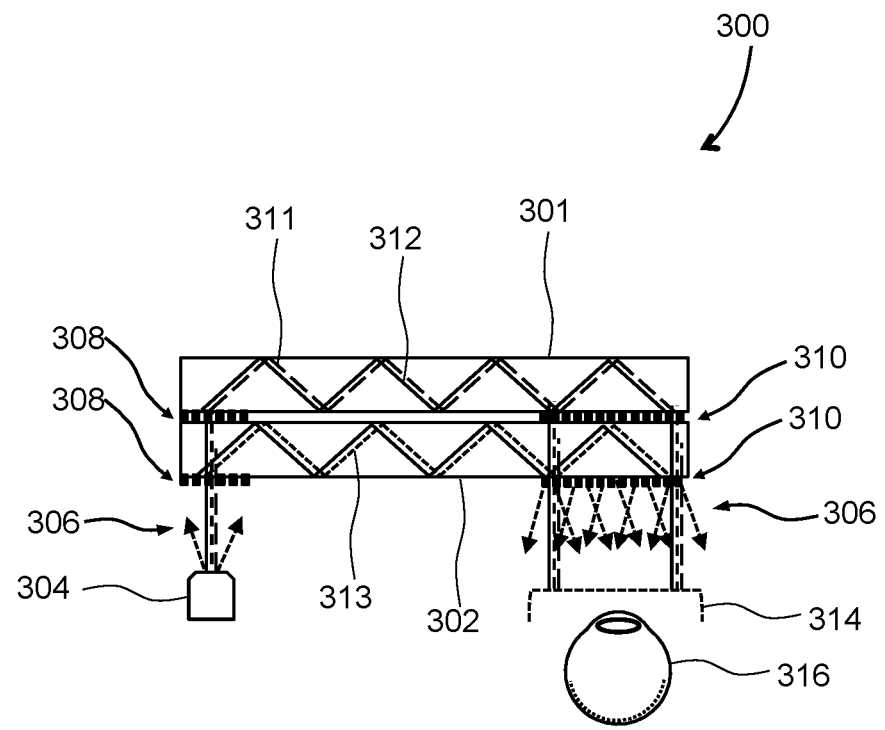
FIG. 3 is a side cross-sectional view of an optics block of the wearable display of FIGS. 1A and 1B.

Turning now to FIG. 3, a display assembly 300 may be used for the display assembly 106 in the display units 104 and 105 of the near-eye AR/VR display 100 of FIG. 1A. The display assembly 300 of FIG. 3 may include first 301 and second 302 pupil-replicating waveguides in a stack configuration. An RGB image source 304 emits a diverging beam of image light 306 carrying an RGB image in angular domain having R, G, and B color channels. Only propagating chief rays are shown for brevity, chief rays 311 for R channel (long-dash lines), chief rays 312 for G channel (solid lines), and chief rays 313 for B channel (short-dash lines). In this example, the first pupil-replicating waveguide 301 is configured to carry B and G color channels, and the second pupil-replicating waveguide 302 is configured to carry G and R color channels. To that end, an assembly of the first 301 and second 302 pupil-replicating waveguides may be equipped with corresponding in-coupling 308 and out-coupling 310 diffraction gratings and/or other color-selective optics, not shown.

In operation, the image light coupled by the in-coupling diffraction gratings 308 propagates in the first 301 and second 302 pupil-replicating waveguides in a zigzag pattern by total internal reflection (TIR) from the top and bottom surfaces of the first 301 and second 302 pupil-replicating waveguides, and is out-coupled by the out-coupling diffraction gratings 310 at an eyebox 314 for observation by a user's eye 316. In the first display unit 104 (FIG. 1A), the first pupil-replicating waveguide 301 (FIG. 3) has a FOV for the B color channel offset from a field of view of the R color channel in the first direction 214 (FIG. 2). The FOV of the G color channel in this example is wider and encompasses the FOV of both B and R color channels, because light of the G color channel propagates in both the first 301 and second 302 pupil-replicating waveguides. In the second display unit 105, the FOV of R and B color channels is reversed, and the FOV of the G color channel is the same. The overall FOV for R, G, B color channels corresponds to that shown in FIG. 2 in this example.

It is further to be stressed that the display assembly 300 of FIG. 3 with a pair of pupil-replicating waveguides 301, 302 in a stack configuration is only an example. In some embodiments, a pupil-replicating waveguide assembly including only one waveguide, or three or more waveguides may be provided for each one of the left 104 and right 105 display units of FIG. 1, optionally with the FOV for R, G, B color channels shown in FIG. 2. For example, for a single waveguide per display configuration, the first display may include a first pupil-replicating waveguide having a field of view for the first color channel offset from a field of view of the second color channel in the first direction, and the second display may include a second pupil-replicating waveguide having a field of view for the first color channel offset from a field of view of the second color channel in the second direction. Furthermore, a wearable display, such as a near-eye display (NED) or a head-mounted display (HMD), may be based on other technologies than pupil-replicating waveguides. Accordingly, the teaching of the present disclosure is also applicable to any display system where a tradeoff exists between the color range displayed and FOV horizontal or vertical spans for a particular color range, and where separate display blocks or portions of a single display are used to present separate images to the left and right eyes of a user.

Figure 4A:
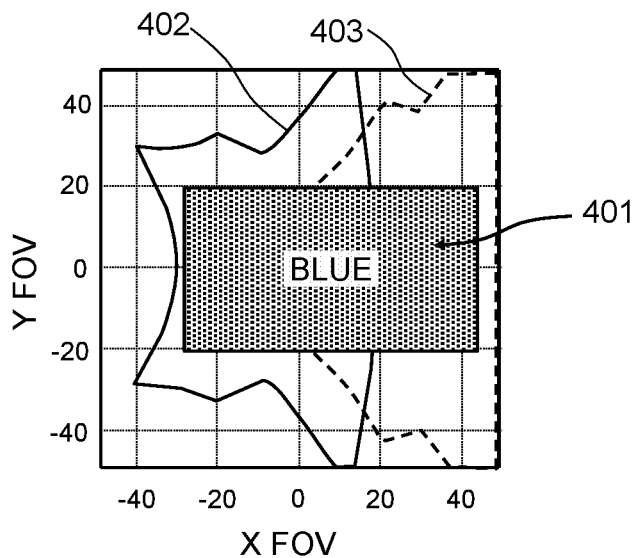
FIGS. 4A, 4B, and 4C are FOV diagrams for blue (B), green (G), and red (R) color channels of the optics block of FIG. 3.
Figure 4B:
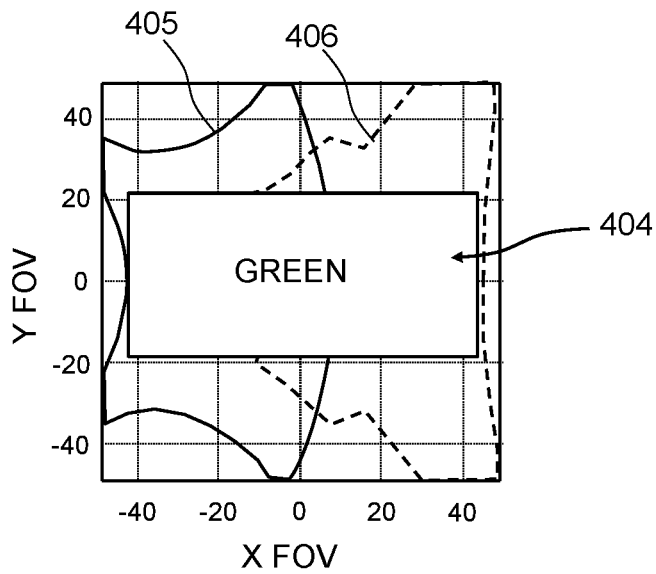
Figure 4C:
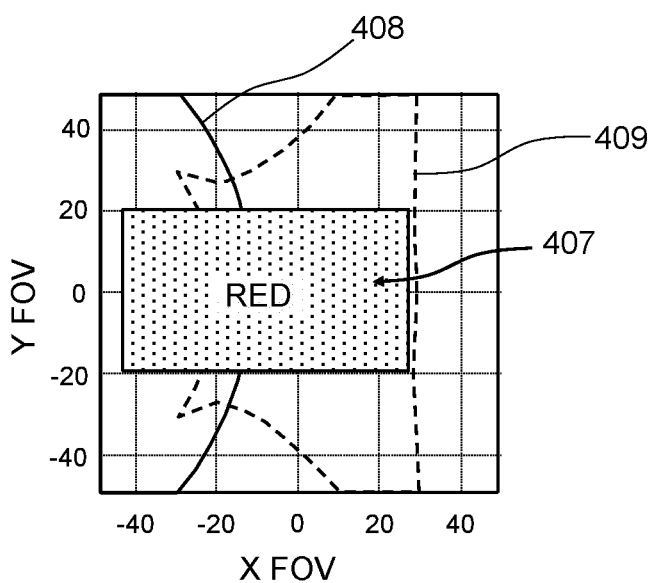

Turning to FIGS. 4A, 4B, and 4C, FOVs of different color channels are shown for a case when each display assembly includes two pupil-replicating waveguides, where an image source is disposed on the left or right of the pupil-replicating waveguides and where each color channel propagates in both of the two pupil-replicating waveguides. FIG. 4A shows the FOV 401 for B color channel superimposed with FOVs 402 and 403 of individual pupil-replicating waveguides; FIG. 4B shows the FOV 404 for G color channel superimposed with FOVs 405 and 406 of individual pupil-replicating waveguides; and FIG. 4C shows the FOV 407 for B color channel superimposed with FOVs 408 and 409 of individual pupil-replicating waveguides.

Figure 5:
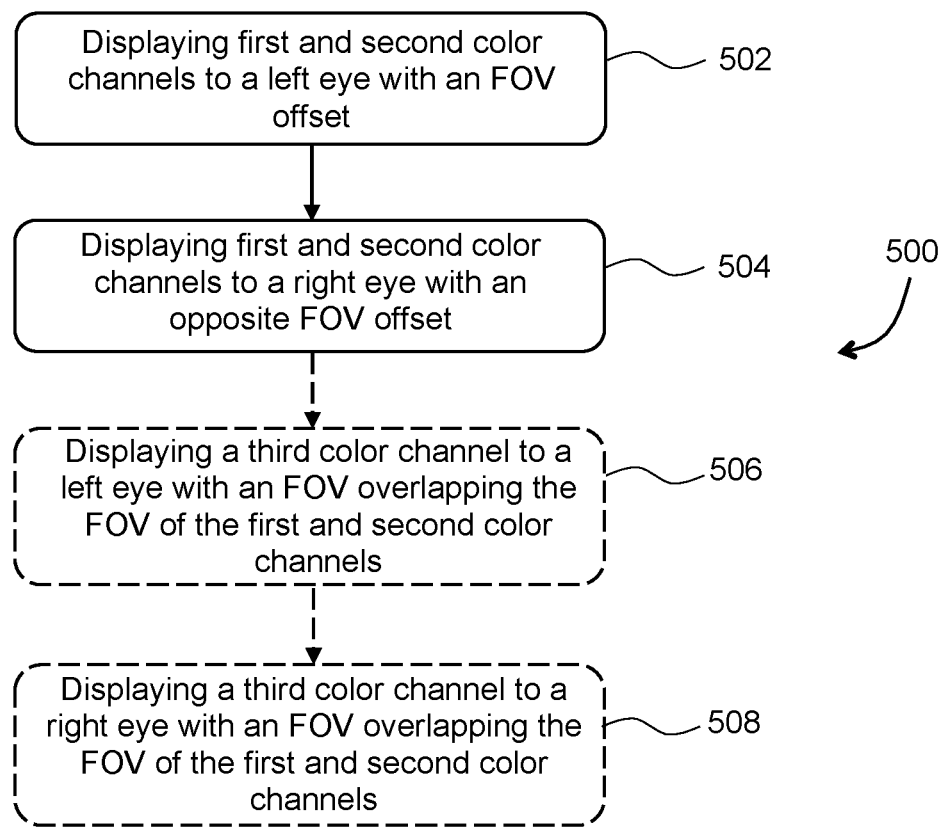
FIG. 5 is a flow chart of a method for displaying a color stereoscopic image in accordance with the present disclosure.

Referring now to FIG. 5, a method 500 for displaying a color stereoscopic image is presented. The color stereoscopic image includes first and second images for user's left and right eyes respectively. First and second color channels of the first image are displayed (502) to the left eye of the user. An FOV of the first color channel of the first image is offset from an FOV of the second color channel of the first image in a first direction. First and second color channels of the second image are displayed (504) to the right eye of the user, e.g. simultaneously with displaying the first and second color channels to the left eye, or sequentially in turns to the left and right eye. An FOV of the first color channel of the second image is offset from an FOV of the second color channel of the second image in a second direction opposite to the first direction. The FOV of the first color channel of the first image may coincide with the FOV of the second color channel of the second image, and the FOV of the second color channel of the first image may coincide with the FOV of the first color channel of the second image, as shown in FIG. 2.

The method 500 of FIG. 5 may further include displaying (506) a third color channel of the first image to the left eye, such that an FOV of the third color channel includes the FOVs of the first and second color channels of the first image, and displaying (508) a third color channel of the second image to the right eye, such that an FOV of the third color channel includes the FOVs of the first and second color channels of the second image. Displaying the third color channel to the left and right eyes may be performed simultaneously with displaying the first and second color channels, or sequentially. The first color channel can be a blue channel, the second color channel can be a red channel, and the third color channel can be a green channel, although other channel assignments may be used. Furthermore, alternative color schemes, e.g. Cyan-Magenta-Yellow color scheme, or another scheme, may be used. The first and second directions are preferably horizontal directions, because it is more natural for a human vision to have a larger FOV in horizontal direction than in a vertical direction.

Figure 6:
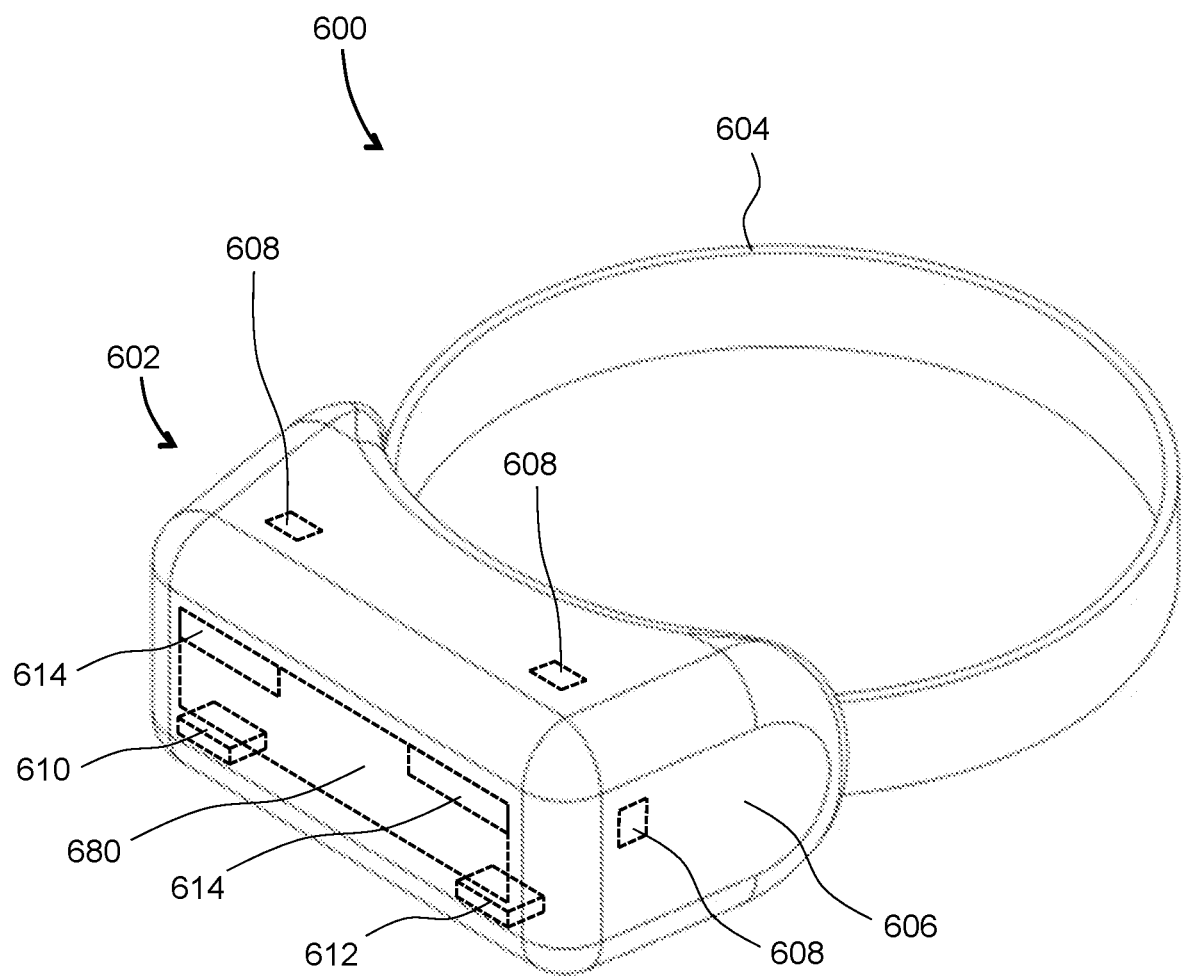
FIG. 6 is an isometric view of a head-mounted display (HMD) of the present disclosure.

Turning now to FIG. 6, a head-mounted display (HMD) 600 is an example of an AR/VR wearable display system which encloses the user's face, for a greater degree of immersion into the AR/VR environment. The HMD 600 can be a part of an AR/VR system, which may further include a user position and orientation tracking system, an external camera, a gesture recognition system, control means for providing user input and controls to the system, and a central console for storing software programs and other data for interacting with the user for interacting with the AR/VR environment. The function of the HMD 600 is to augment views of a physical, real-world environment with computer-generated imagery, and/or to generate the entirely virtual 3D imagery.

The HMD 600 may include a front body 602 and a band 604. The front body 602 is configured for placement in front of eyes of a user in a reliable and comfortable manner, and the band 604 may be stretched to secure the front body 602 on the user's head. A display 680 may include the display assembly 300 of FIG. 3, for example. The display 680 may be disposed in the front body 602 for presenting AR/VR images to the user. Sides 606 of the front body 602 may be opaque or transparent. An electronic display of the display 680 may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof.

In some embodiments, the front body 602 includes locators 608, an inertial measurement unit (IMU) 610 for tracking acceleration of the HMD 600, and position sensors 612 for tracking position of the HMD 600. The locators 608 are traced by an external imaging device of a virtual reality system, such that the virtual reality system can track the location and orientation of the entire HMD 600. Information generated by the IMU and the position sensors 612 may be compared with the position and orientation obtained by tracking the locators 608, for improved tracking of position and orientation of the HMD 600. Accurate position and orientation is important for presenting appropriate virtual scenery to the user as the latter moves and turns in 3D space.

The HMD 600 may further include an eye tracking system 614, which determines orientation and position of user's eyes in real time. The obtained position and orientation of the eyes allows the HMD 600 to determine the gaze direction of the user and to adjust the image generated by the display system 680 accordingly. In some embodiments, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 602.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display apparatus for displaying a color stereoscopic image comprising first and second images for user's left and right eyes respectively, the display system apparatus comprising:
    a first display assembly comprising components for displaying first and second color channels of the first image to the left eye, such that a field of view (FOV)

of the first color channel of the first image is offset from an FOV of the second color channel of the first image in a first direction; and
a second display assembly comprising components for displaying first and second color channels of the second image to the right eye, such that an FOV of the first color channel of the second image is offset from an FOV of the second color channel of the second image in a second direction opposite to the first direction.

2. The display apparatus of claim 1, wherein the FOV of the first color channel of the first image overlaps the FOV of the second color channel of the second image.

3. The display apparatus of claim 2, wherein the FOV of the second color channel of the first image overlaps the FOV of the first color channel of the second image.

4. The display apparatus of claim 1, wherein the first and second images each comprise a third color channel, wherein the first and second display assemblies are configured for displaying the third color channel with an FOV including the FOVs of the first and second color channels of each one of the first and second images.

5. The display apparatus of claim 4, wherein the first color channel is a blue channel, the second color channel is a red channel, and the third color channel is a green channel.

6. The display apparatus of claim 1, wherein the first display assembly comprises a first pupil-replicating waveguide having an FOV for the first color channel offset from an FOV of the second color channel in the first direction, and wherein the second display assembly comprises a second pupil-replicating waveguide having an FOV for the first color channel offset from an FOV of the second color channel in the second direction.

7. A wearable display apparatus for displaying a color stereoscopic image comprising first and second images for user's left and right eyes respectively, the wearable display apparatus comprising:
a first pupil-replicating waveguide assembly for displaying first and second color channels of the first image to the left eye, the first pupil-replicating waveguide assembly having a field of view (FOV) for a first color channel offset from an FOV of the second color channel in a first direction; and
a second pupil-replicating waveguide assembly for displaying first and second color channels of the second image to the right eye, the second pupil-replicating waveguide assembly having an FOV for a first color channel offset from an FOV of the second color channel in a second direction opposite to the first direction.

8. The wearable display apparatus of claim 7, wherein the FOV of the first pupil-replicating waveguide assembly for the first color channel overlaps the FOV of the second pupil-replicating waveguide assembly for the second color channel.

9. The wearable display apparatus of claim 8, wherein the FOV of the first pupil-replicating waveguide assembly for the second color channel overlaps the FOV of the second pupil-replicating waveguide assembly for the first color channel.

10. The wearable display apparatus of claim 7, wherein the first and second directions are horizontal directions when the wearable display apparatus is worn by a user for displaying the color stereoscopic image.

11. The wearable display apparatus of claim 7, wherein the first and second images each comprise a third color channel;
wherein an FOV of the first pupil-replicating waveguide assembly for the third color channel includes the FOVs of the first pupil-replicating waveguide assembly for each one of the first and second color channels; and
wherein an FOV of the second pupil-replicating waveguide assembly for the third color channel includes the FOVs of the second pupil-replicating waveguide assembly for each one of the first and second color channels.

12. The wearable display apparatus of claim 11, wherein the first and second pupil-replicating waveguide assemblies each comprise a first waveguide for conveying light of at least the first color channel, and a second waveguide for conveying light of at least the second color channel.

13. The wearable display apparatus of claim 12, wherein the first and second waveguides of each one of the first and second pupil-replicating waveguide assemblies are each configured for propagating light at the third color channel.

14. The wearable display apparatus of claim 11, wherein the first color channel is a blue channel, the second color channel is a red channel, and the third color channel is a green channel.

15. A method for displaying a color stereoscopic image comprising first and second images for user's left and right eyes respectively, the method comprising:
using a first display assembly to display first and second color channels of the first image to the left eye, such that a field of view (FOV) of the first color channel of the first image is offset from an FOV of the second color channel of the first image in a first direction; and
using a second display assembly to display first and second color channels of the second image to the right eye, such that an FOV of the first color channel of the second image is offset from an FOV of the second color channel of the second image in a second direction opposite to the first direction.

16. The method of claim 15, wherein the FOV of the first color channel of the first image overlaps the FOV of the second color channel of the second image.

17. The method of claim 16, wherein the FOV of the second color channel of the first image overlaps the FOV of the first color channel of the second image.

18. The method of claim 15, further comprising:
using a first display assembly to display a third color channel of the first image to the left eye, such that an FOV of the third color channel includes the FOVs of the first and second color channels of the first image; and
using a second display assembly to display a third color channel of the second image to the right eye, such that an FOV of the third color channel includes the FOVs of the first and second color channels of the second image.

19. The method of claim 18, wherein the first color channel is a blue channel, the second color channel is a red channel, and the third color channel is a green channel.

20. The method of claim 15, wherein the first and second directions are horizontal directions.

\* \* \* \* \*